US012764002B2

(12) United States Patent
Chi et al.

(10) Patent No.: US 12,764,002 B2
(45) Date of Patent: Oct. 13, 2026

(54) METHOD AND DEVICE FOR TRANSMITTING CONFIGURATION INFORMATION OF REFERENCE SIGNAL AND METHOD AND DEVICE FOR RECEIVING CONFIGURATION INFORMATION OF REFERENCE SIGNAL

(71) Applicant: Beijing Xiaomi Mobile Software Co., Ltd., Beijing (CN)

(72) Inventors: Liangang Chi, Beijing (CN); Gaoming Duan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 43 days.

(21) Appl. No.: 18/865,243

(22) PCT Filed: May 16, 2022

(86) PCT No.: PCT/CN2022/093161
§ 371 (c)(1),
(2) Date: Nov. 12, 2024

(87) PCT Pub. No.: WO2023/220899
PCT Pub. Date: Nov. 23, 2023

(65) Prior Publication Data
US 2025/0310159 A1 Oct. 2, 2025

(51) Int. Cl.
*H04K 1/10* (2006.01)
*H04B 17/309* (2015.01)
(Continued)

(52) U.S. Cl.
CPC ....... *H04L 27/0012* (2013.01); *H04B 17/309* (2015.01); *H04L 5/0048* (2013.01)

(58) Field of Classification Search
CPC .. H04L 27/0012; H04L 5/0048; H04B 17/309
(Continued)

(56) References Cited

U.S. PATENT DOCUMENTS

| | | | | |
|---|---|---|---|---|
| 2022/0078780 A1* | 3/2022 | Choi | H04B 7/0456 | |
| 2023/0093039 A1* | 3/2023 | Lv | H04B 17/345 | 370/330 |

(Continued)

FOREIGN PATENT DOCUMENTS

| | | |
|---|---|---|
| CN | 112803975 A | 5/2021 |
| CN | 112887989 A | 6/2021 |

(Continued)

*Primary Examiner* — Zewdu A Kassa
(74) *Attorney, Agent, or Firm* — McCoy Russell LLP

(57) ABSTRACT

A method for transmitting configuration information of a reference signal is provided. The method includes: receiving capability information transmitted from a second communication device; and transmitting configuration information of an orbital angular momentum (OAM) measurement reference signal to the second communication device, where the configuration information is configured to indicate at least one of an antenna port of the second communication device for measuring the OAM measurement reference signal or an OAM mode value corresponding to the antenna port, where the OAM mode value is determined according to a number of OAM modes supported by the second communication device in the capability information.

20 Claims, 5 Drawing Sheets

(51) Int. Cl.
*H04L 5/00* (2006.01)
*H04L 27/00* (2006.01)

(58) Field of Classification Search
USPC ................ 375/260, 261, 259, 219, 295, 316
See application file for complete search history.

(56) References Cited

U.S. PATENT DOCUMENTS

| | | | | |
|---|---|---|---|---|
| 2023/0171056 A1* | 6/2023 | Huang | .................. | H04W 24/02 370/328 |
| 2024/0422779 A1* | 12/2024 | Choi | ..................... | H04L 5/0053 |

FOREIGN PATENT DOCUMENTS

| | | | |
|---|---|---|---|
| CN | 113747575 | A | 12/2021 |
| WO | 2022088126 | A1 | 5/2022 |

* cited by examiner

METHOD AND DEVICE FOR TRANSMITTING CONFIGURATION INFORMATION OF REFERENCE SIGNAL AND METHOD AND DEVICE FOR RECEIVING CONFIGURATION INFORMATION OF REFERENCE SIGNAL

CROSS-REFERENCE TO RELATED APPLICATIONS

The present application is a U.S. National Stage of International Application No. PCT/CN2022/093161, filed on May 16, 2022, the contents of all of which are incorporated herein by reference in their entirety for all purposes.

BACKGROUND OF THE INVENTION

With the continuous development of wireless communication, the demands for communication capabilities are also increasing. In addition to developing higher frequency bands, theoretically, the utilization of the orthogonal properties between orbital angular momentum (OAM) beams can infinitely enhance spectrum efficiency.

SUMMARY OF THE INVENTION

The present disclosure relates to the technical field of communications, and in particular to a method and device for transmitting configuration information of a reference signal, and a method and device for receiving configuration information of a reference signal.

In a first aspect, a method for transmitting configuration information of a reference signal is provided according to an embodiment of the present disclosure. The method is performed by a first communication device, and includes:

- receiving capability information transmitted from a second communication device; and
- transmitting configuration information of an orbital angular momentum (OAM) measurement reference signal to the second communication device, where the configuration information is configured to indicate at least one of an antenna port of the second communication device for measuring the OAM measurement reference signal or an OAM mode value corresponding to the antenna port, where the OAM mode value is determined according to a number of OAM modes supported by the second communication device in the capability information.

In a second aspect, a method for receiving configuration information of a reference signal is provided according to an embodiment of the present disclosure. The method is performed by a second communication device, and includes:

- transmitting capability information to a first communication device; and
- receiving configuration information of an orbital angular momentum (OAM) measurement reference signal transmitted from the first communication device, where the configuration information is configured to indicate at least one of an antenna port of the second communication device for measuring the OAM measurement reference signal or an OAM mode value corresponding to the antenna port, where the OAM mode value is determined according to a number of OAM modes supported by the second communication device in the capability information.

In a third aspect, a communication device is provided according to an embodiment of the present disclosure. The communication device includes one or more processors and a memory that stores a computer program. The one or more processors execute the computer program stored in the memory to cause the communication device to receive capability information transmitted from a second communication device; and transmit configuration information of an orbital angular momentum (OAM) measurement reference signal to the second communication device, where the configuration information is configured to indicate at least one of an antenna port of the second communication device for measuring the OAM measurement reference signal or an OAM mode value corresponding to the antenna port, where the OAM mode value is determined according to a number of OAM modes supported by the second communication device in the capability information.

In a fourth aspect, a communication device is provided according to an embodiment of the present disclosure. The communication device includes one or more processors and a memory that stores a computer program. The one or more processors execute the computer program stored in the memory to cause the communication device to perform the method of the second aspect.

In a fifth aspect, a non-transitory computer-readable storage medium is provided according to an embodiment of the present disclosure. The non-transitory computer-readable storage medium is configured to store instructions for a first communication device described above. When the instructions are executed, the first communication device is caused to perform the method of the first aspect.

In a sixth aspect, a non-transitory computer-readable storage medium is provided according to an embodiment of the present disclosure. The non-transitory computer-readable storage medium is configured to store instructions for a second communication device described above. When the instructions are executed, the second communication device is caused to perform the method of the second aspect.

BRIEF DESCRIPTION OF DRAWINGS

In order to more clearly illustrate the examples of the present disclosure or the technical solution in the prior art, the accompanying drawings required for the examples of the present disclosure or the prior art will be explained below.

DETAILED DESCRIPTION OF THE INVENTION

For ease of understanding, terms involved in the present disclosure are introduced at first.

1. Orbital Angular Momentum (OAM)

The OAM refers to the rotation of an electron around the propagation axis, which is generated by the energy flow rotating around the optical axis. This causes the phase wavefront of the electromagnetic wave to have a vortex shape. OAM is independent of traditional modulation dimensions such as phase, frequency, and polarization. Theoretically, the OAM modes carried by vortex electromagnetic waves can have an infinite number of different integer eigenvalues (OAM mode values), and OAM beams with different integer eigenvalues are mutually orthogonal, which can theoretically lead to an unlimited increase in spectral efficiency.

Before transmitting downlink signals using OAM beams, channel estimation needs to be performed based on the configuration information of the OAM measurement reference signals to obtain channel information. However, there is currently a lack of effective means to determine the configuration information of the OAM measurement reference signal.

In order to better understand a method for transmitting configuration information of a reference signal and a method for receiving configuration information of a reference signal disclosed in embodiments of the present disclosure, a communication system to which the embodiments of the present disclosure are applicable is first described below.

Figure 1:
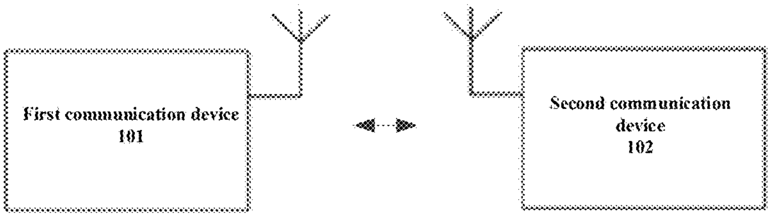
FIG. 1 is a schematic diagram of an architecture of a communication system according to an embodiment of the present disclosure.

With reference to FIG. 1, FIG. 1 is a schematic diagram of an architecture of a communication system according to an embodiment of the present disclosure. The communication system may include, but is not limited to, a first communication device and a second communication device. The number and form of the devices shown in FIG. 1 are merely illustrative and do not constitute a limitation to the examples of the present disclosure. In the practical application, two or more first communication devices and two or more second communication devices may be included. For example, the communication system shown in FIG. 1 includes one first communication device 101 and one second communication device 102.

It should be noted that the technical solution of the embodiments of the present disclosure may be applied to various communication systems, for example, a long term evolution (LTE) system, a 5th generation (5G) mobile communication system, a 5G new radio system, other future new mobile communication systems, etc.

The first communication device 101 in the embodiments of the present disclosure is an entity on a network side for transmitting or receiving signals. For example, the first communication device 101 may be an evolved NodeB (eNB), a transmission reception point (TRP), a next generation NodeB (gNBs) in an NR system, a relay device, a base station in other future mobile communication systems, or an access node in a wireless fidelity (WiFi) system, etc. The specific technology and device form used by the first communication device are not limited in the embodiments of the present disclosure. The first communication device provided in the embodiment of the present disclosure may be composed of a central unit (CU) and a distributed unit (DU). The CU may also be referred to as a control unit. By using a CU-DU structure, protocol layers of the first communication device, such as a base station, may be split, functions of some protocol layers are centrally controlled by the CU, functions of some or all of the remaining protocol layers are distributed in the DU, and the DU is centrally controlled by the CU.

The second communication device 102 in the embodiment of the present disclosure is an entity on a user side configured to receive or transmit signals, such as a mobile phone. The second communication device may also be referred to as a terminal, user equipment (UE), a mobile station (MS), a mobile device (MT), etc. The second communication device may be a car with a communication function, a smart car, a mobile phone, a wearable device, a Pad, a computer with a radio transceiving function, a virtual reality (VR) terminal device, an augmented reality (AR) terminal device, a wireless terminal device in industrial control, a wireless terminal device in self-driving, a wireless terminal device in remote medical surgery, a wireless terminal device in a smart grid, a wireless terminal device in transportation safety, a wireless terminal device in a smart city, a wireless terminal device in smart home, etc. The second communication device 102 may also be a relay device for forwarding. The specific technology and device form used by the second communication device are not limited in the embodiments of the present disclosure.

Information transmission is performed between the first communication device and the second communication device by using OAM radio frequency electromagnetic waves, which may effectively boost spectrum utilization. The OAM radio frequency electromagnetic waves may be generated by a uniform circular array (UCA), a spiral phase plate, a parabolic antenna, and a special electromagnetic structure. In the OAM communication system based on the UCA, before the first communication device transmits a downlink signal to the second communication device, channel estimation needs to be performed to obtain channel information. In a process of channel estimation, how to determine configuration information for the second communication device to measure an OAM measurement reference signal is a problem to be solved. In view of this, a method for transmitting configuration information of a reference signal is provided according to the embodiment of the present disclosure. The configuration information for an antenna port of the second communication device to measure the OAM measurement reference signal is determined according to the capability information received from the second communication device, and the configuration information is transmitted to the second communication device. In this way, the configuration information for the second communication device to measure the OAM measurement reference signal is determined.

It can be understood that the communication system described in the embodiments of the present disclosure is for the purpose of more clearly illustrating the technical solutions provided in the embodiments of the present disclosure, which does not constitute a limitation on the technical solutions provided in the embodiments of the present disclosure. Those skilled in the art will know that the technical solutions provided in the examples of the present disclosure are also applicable to similar technical problems along with evolution of a system architecture and emergence of new service scenarios.

The method and device for transmitting configuration information of a reference signal provided in the present disclosure are described in detail below in conjunction with the accompanying drawings.

Figure 2:
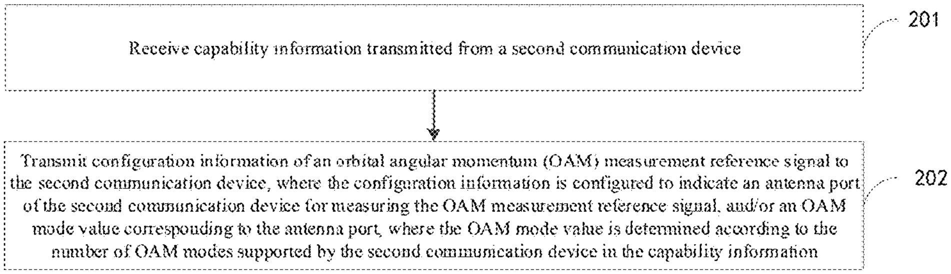
FIG. 2 is a schematic flowchart of a method for transmitting configuration information of a reference signal according to an embodiment of the present disclosure.

With reference to FIG. 2, FIG. 2 is a schematic flowchart of a method for transmitting configuration information of a reference signal according to an embodiment of the present disclosure. The method is executed by a first communication device.

In the embodiment of the present disclosure, the first communication device is described as a base station, while the second communication device is described as a terminal device or relay device.

In a first scenario of the embodiment of the present disclosure, when the first communication device is a base station, the second communication device is a terminal device or a relay device.

In a second scenario of the embodiment of the present disclosure, when the first communication device is a base station, and the second communication device is a relay device.

In a third scenario of the embodiment of the present disclosure, when the first communication device is a relay device, the second communication device is a terminal device.

As shown in FIG. 2, the method may include, but is not limited to, steps S201 to S202: S201, capability information transmitted from a second communication device is received.

The capability information includes the number of OAM modes supported by the second communication device. The number of OAM modes may be the maximum number of OAM modes supported by the second communication device. The number of OAM modes may be a set integer value determined according to transmission performance of the second communication device. For example, the number of OAM modes may be 2. Alternatively, the number of OAM modes may be 6. Alternatively, the number of OAM modes may be 9.

Optionally, the number of OAM modes supported by the second communication device is less than or equal to the supported maximum number of OAM modes, and may include the maximum number of OAM modes for transmission and the maximum number of OAM modes for reception supported by the second communications device.

In an implementation of the embodiment of the present disclosure, the first communication device transmits a capability query request to the second communication device, such that the first communication device may receive capability information transmitted from the second communication device.

In a second implementation of the embodiment of the present disclosure, the first communication device may also receive capability information actively transmitted from the second communication device.

Furthermore, the first communication device may determine a mode capability of the second communication device according to the number of OAM modes carried in the capability information. In this way, the OAM mode value of the OAM measurement reference signal corresponding to at least one antenna port of the second communication device for measuring the OAM measurement reference signal may be configured according to the number of OAM modes, to generate the configuration information.

S202, configuration information of the OAM measurement reference signal is transmitted to the second communication device, where the configuration information is configured to indicate an antenna port of the second communication device for measuring the OAM measurement reference signal, and/or an OAM mode value corresponding to the antenna port, where the OAM mode value is determined according to the number of OAM modes supported by the second communication device in the capability information.

The OAM measurement reference signal refers to a downlink measurement reference signal carried on a spiral electromagnetic wave and configured for downlink channel estimation or channel measurement. For example, the OAM measurement reference signal may be a cell-specific reference signal (CRS) or a channel state information-reference signal (CSI-RS).

As an implementation, the configuration information is configured to indicate the antenna port of the second communication device for measuring the OAM measurement reference signal. At least one antenna port is provided. In other words, the antenna port that is indicated in the configuration information for measuring the OAM measurement reference signal is configured to measure the OAM measurement reference signal. Such antenna port has a corresponding OAM mode value. Hence, by indicating the antenna port for measuring the OAM measurement reference signal in the configuration information, it can allow the second communication device to determine the OAM mode value corresponding to the at least one antenna port.

As a second implementation, the configuration information is configured to indicate the OAM mode value corresponding to the antenna port. The corresponding antenna port may be determined according to the OAM mode value. At least one antenna port is provided. For example, when the OAM mode value is [−2, 1], it is determined that the corresponding antenna ports are port 2 to port 5, and a correspondence relationship between the OAM measurement value and the antenna port is established by indicating the OAM mode value corresponding to the antenna port.

As a third implementation, the configuration information is configured to indicate at least one antenna port of the second communication device for measuring the OAM measurement reference signal and the OAM mode value corresponding to the at least one antenna port, to enable a dual indication, which means the antenna port is indicated and the OAM mode value corresponding to the antenna port is also indicated. In this way, the OAM mode value corresponding to the antenna port is determined when the antenna port measures the OAM measurement reference signal. In a case where the OAM mode value corresponding to the antenna port is not fixed, a correspondence relationship between the antenna port and the OAM mode value may be established, there by improving the reliability of determining the OAM mode value of the OAM measurement reference signal corresponding to the antenna port.

For the OAM mode value and the number of OAM modes, in an implementation of the embodiment of the present disclosure, there is a correspondence relationship between the OAM mode value and the number of OAM modes supported by the second communication device. The correspondence relationship is configured to generate the OAM mode value in the configuration information according to the number of OAM modes in the capability information. It should be noted that the OAM mode value corresponds to a mode of the OAM. The number of OAM modes is also referred to as the OAM mode count.

Optionally, an OAM mode value combination corresponds to the number of OAM modes. The OAM mode value combination includes OAM mode values matching the number of OAM modes supported by the second communication device. The number of OAM modes matches the number of OAM mode values. For example, in a case where the number of OAM modes is 8, the OAM mode value combination is [−4, −3, −2, −1, 0, 1, 2, 3], and the number of the OAM mode values is 8, such that the number of the OAM mode values 8 matches the number of OAM modes 8. The correspondence relationship between the number of OAM modes and the OAM mode value combination may be preset. The correspondence relationship between the OAM mode value combination and the number of OAM modes and the interval between the OAM mode values in the OAM mode value combination are not limited in the embodiment. Further, after the corresponding OAM mode value combination is determined according to the number of OAM modes, when the OAM mode value corresponding to at least one antenna port is determined from the OAM mode value combination, as an implementation, the OAM mode value corresponding to at least one antenna port is determined in a random matching manner. As a second implementation, the OAM mode values with a greater module value interval may be selected from the OAM mode value combination as the OAM mode value corresponding to at least one antenna port. As a third implementation, the OAM mode value corresponding to the number of the antenna ports and having a greater module value may be selected from the OAM mode value combination as the OAM mode value corresponding to at least one antenna port. A method for determining the OAM mode value corresponding to at least one antenna port according to the number of OAM modes is not limited in the example.

In the method for transmitting configuration information of a reference signal according to the embodiment of the present disclosure, the capability information transmitted from the second communication device is received; and the configuration information of the OAM measurement reference signal is transmitted to the second communication device, where the configuration information is configured to indicate an antenna port of the second communication device for measuring the OAM measurement reference signal, and/or an OAM mode value corresponding to the antenna port, and the OAM mode value is determined according to the number of OAM modes supported by the second communication device in the capability information. The configuration information of the OAM measurement reference signal corresponding to the second communication device is determined according to the received capability information of the second communication device, such that the configuration information for the second communication device to measure the OAM measurement reference signal is determined when downlink data transmission is performed between the first communication device and the second communication device by using an OAM signal.

Figure 3:
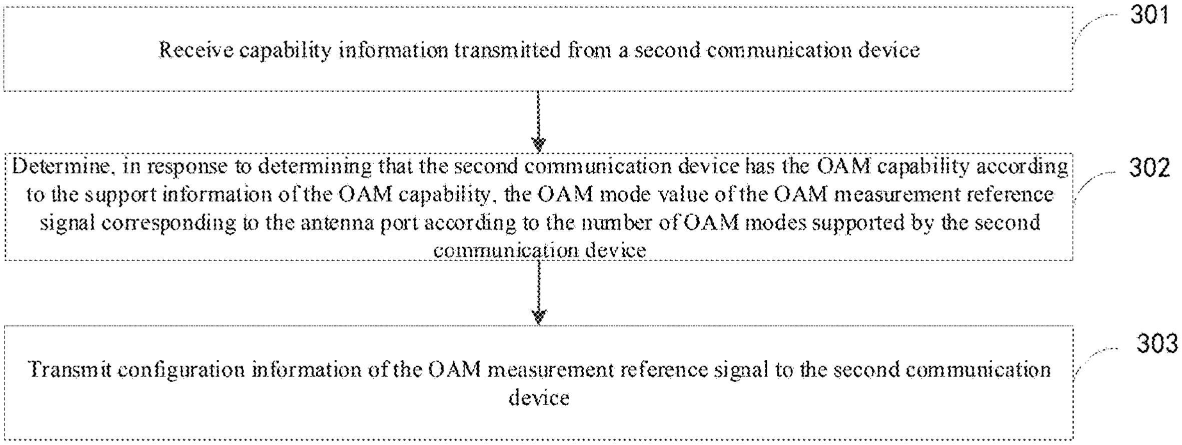
FIG. 3 is a schematic flowchart of a method for transmitting configuration information of a reference signal according to another embodiment of the present disclosure.

With reference to FIG. 3, FIG. 3 is a schematic flowchart of a method for transmitting configuration information of a reference signal according to an embodiment of the present disclosure. The method is performed by a first communication device. As shown in FIG. 3, the method may include, but is not limited to, steps S301 to S303 as follows.

S301, capability information transmitted from a second communication device is received.

The capability information includes support information of an OAM capability and the number of OAM modes supported by the second communication device.

In the embodiment of the present disclosure, the support information of the OAM capability indicates whether the second terminal device has the OAM capability, that is, whether the second terminal device supports data transmission with the first terminal device by using an OAM wave. In a scenario, the capability information indicates that the second terminal device has the OAM capability. In another scenario, the capability information indicates that the second terminal device has no OAM capability.

The explanation of S201 is also applicable to this step, and a principle is the same, which is not repeated here.

S302, the OAM mode value of the OAM measurement reference signal corresponding to the antenna port is determined according to the number of OAM modes supported by the second communication device, in response to determining that the second communication device has the OAM capability according to the support information of the OAM capability.

An antenna indicated by the antenna port is, for example, a UCA antenna, to generate a vortex electromagnetic wave. The vortex electromagnetic wave is combined with the OAM mode, such that data transmission is implemented through multiplexing of the vortex electromagnetic wave of different modes, and the spectrum utilization is boosted.

In the embodiment of the present disclosure, the number of OAM modes supported by the second communication device is less than or equal to the maximum number of OAM modes supported by the second communication device. In the foregoing example, the explanation of correlation between the number of OAM modes and the OAM mode value is also applicable to step 302, and a principle is the same, which is not repeated here.

Step 303, configuration information of the OAM measurement reference signal is transmitted to the second communication device.

The configuration information includes an antenna port for measuring the OAM measurement reference signal, and/or an OAM mode value corresponding to the antenna port.

For explanation of the configuration information, reference may be made to the explanation in the foregoing example, which is not repeated here.

In the embodiment of the present disclosure, in response to determining that the second communication device has the OAM capability according to the capability information received from the second communication device includes the support information of the OAM capability, the OAM mode value of the OAM measurement reference signal corresponding to the antenna port is determined according to the number of OAM modes supported by the second communication device, and the configuration information of the OAM measurement reference signal is transmitted to the second communication device. The configuration information includes the antenna port for measuring the OAM measurement reference signal, and/or the OAM mode value corresponding to the antenna port. The antenna port for measuring the OAM measurement reference signal, and/or the OAM mode value of the OAM measurement reference signal corresponding to the antenna port may be determined by the second communication device through the configuration information, such that mode configuration of the antenna port of the second communication device for measuring the OAM measurement reference signal and a mapping relationship between the mode and the antenna port are determined according to the capability information of the second communication device during downlink transmission, and the configuration information is determined before channel estimation of the downlink transmission.

In another embodiment of the present disclosure, the configuration information includes time-frequency domain position indication information. The time-frequency domain position indication information is configured to indicate a time-frequency domain position of the OAM measurement reference signal corresponding to at least one antenna port.

The time-frequency domain position indication information includes at least one of the following:

time domain position indication information, configured to indicate a time domain position for receiving the OAM measurement reference signal;

frequency domain position indication information, configured to indicate a frequency domain position for receiving the OAM measurement reference signal; or a time-frequency domain pattern, configured to indicate a time-frequency domain position for receiving the OAM measurement reference signal.

In a first implementation of the embodiment of the present disclosure, the configuration information includes the time domain position indication information of the OAM measurement reference signal corresponding to the antenna port, to indicate the time interval at which the antenna port may determine to receive data when receiving data sent by the first communication device. A unit of the time interval may be a set number of slots or a set number of orthogonal frequency division multiplexing (OFDM) symbols.

In a second implementation of the embodiment of the present disclosure, the configuration information includes frequency domain position indication information of the OAM measurement reference signal corresponding to the antenna port, to indicate the frequency domain position at which the antenna port may determine to receive data when receiving the data transmitted from the first communication device, that is, in which frequency band the data is received. The frequency domain position indication information may indicate an identifier of a resource block or an identifier of a subcarrier set to which the resource block belongs.

In a third implementation of the embodiment of the present disclosure, the configuration information includes time-frequency position indication information of the OAM measurement reference signal corresponding to the antenna port, that is, a time-frequency position of the antenna port agreed to measure the OAM measurement reference signal. The time-frequency position may be indicated by a time-frequency domain pattern.

In a fourth implementation of the embodiment of the present disclosure, the configuration information includes at least two of the time domain position indication information, the frequency domain position indication information and the time-frequency domain pattern of the OAM measurement reference signal corresponding to the antenna port, so as to satisfy requirements in different scenarios and requirements for signal reception.

As an instance, the configuration information is carried in at least one of the following:

radio resource control (RRC) signaling;

media access control (MAC) signaling; or physical layer signaling.

In a first implementation of the embodiment of the present disclosure, when the configuration information of the OAM measurement reference signal is transmitted from the first terminal device to the second communication device, the RRC signaling is used for carrying to transmit the configuration information.

In a second implementation of the embodiment of the present disclosure, when the configuration information of the OAM measurement reference signal is transmitted from the first terminal device to the second communication device, the MAC signaling is used for carrying to transmit of the configuration information.

In a third implementation of the embodiment of the present disclosure, when the configuration information of the OAM measurement reference signal is transmitted from the first terminal device to the second communication device, the physical layer signaling is used for carrying. The physical layer signaling is, for example, downlink control information (DCI), to transmit the configuration information.

In a fourth implementation of the embodiment of the present disclosure, when the configuration information of the OAM measurement reference signal is transmitted from the first terminal device to the second communication device, at least two of the RRC signaling, the MAC signaling and the physical layer signaling may be used for transmission, so as to improve transmission efficiency and reliability.

In the method for transmitting configuration information of a reference signal in the embodiment of the present disclosure, in response to determining that the second communication device has the OAM capability according to the capability information reported by the second communication device, the first communication device determines the OAM mode value of the OAM measurement reference signal corresponding to each antenna port according to the number of OAM modes in the capability information and the number of OAM modes supported by the second communication device. In addition, the configuration information further includes the time-frequency domain position indication information of the OAM measurement reference signal. In this way, the antenna port required for the OAM measurement reference signal, the OAM mode value corresponding to the antenna port, and the time-frequency domain position indication information may be configured during downlink transmission, thereby addressing the problem of resource configuration to implement channel estimation before downlink signal transmission.

Figure 4:
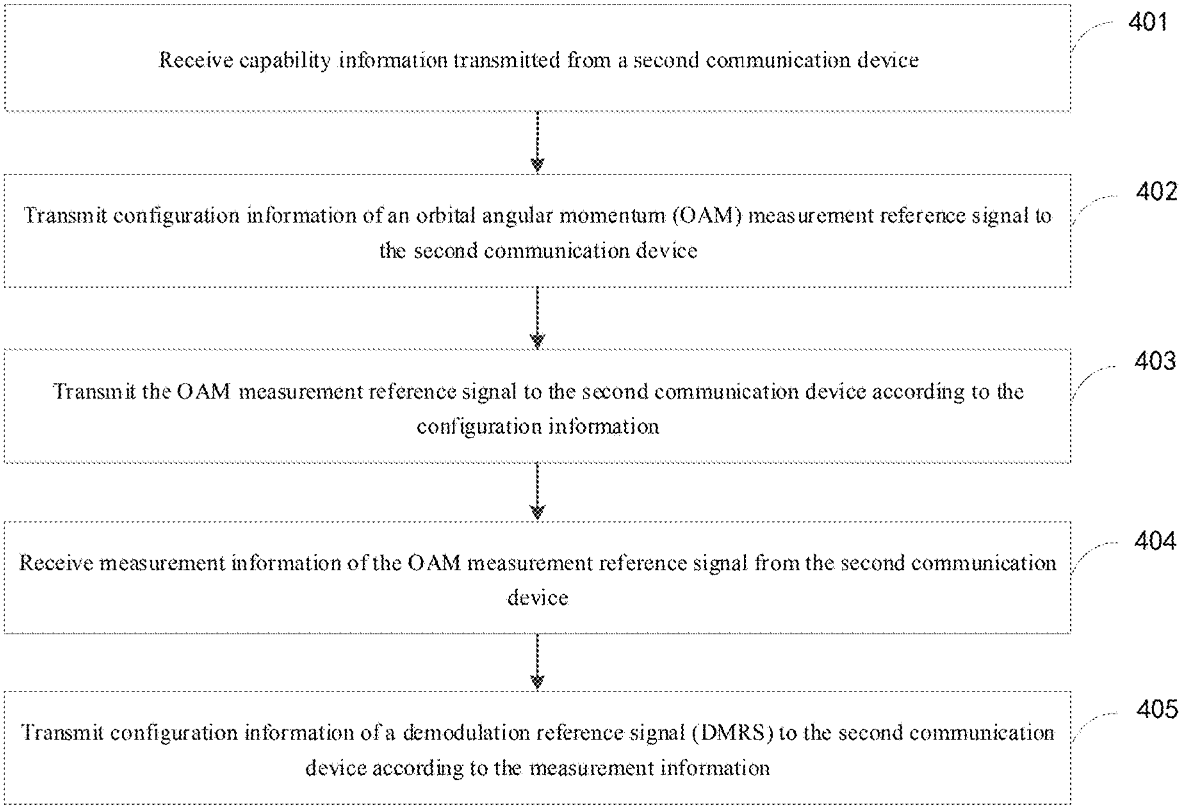
FIG. 4 is a schematic flowchart of a method for transmitting configuration information of a reference signal according to still another embodiment of the present disclosure.

With reference to FIG. 4, FIG. 4 is a schematic flowchart of a method for transmitting configuration information of a reference signal according to an embodiment of the present disclosure. The method is performed by a first communication device. As shown in FIG. 4, the method may include, but is not limited to, step 401 to step 405 as follows.

Step 401, capability information transmitted from a second communication device is received.

Step 402, configuration information of an orbital angular momentum (OAM) measurement reference signal is transmitted to the second communication device.

For explanation of Steps 401 and 402, reference may be made to the explanation in the foregoing examples, and a principle is the same, which is not repeated here.

Step 403: the OAM measurement reference signal is transmitted to the second communication device according to the configuration information.

In the embodiment of the present disclosure, after the configuration information of the OAM measurement reference signal is transmitted from the first communication device to the second communication device, the OAM measurement reference signal is transmitted to the second communication device according to the configuration information. In other words, the OAM measurement reference signal is received at a time-frequency domain position correspondingly according to the antenna port for measuring the OAM measurement reference signal, and/or the OAM mode value corresponding to the antenna port included in the configuration information. In this way, the antenna port of the second communication device measures the OAM measurement reference signal according to the configuration information indicated by the first communication device, to obtain measurement information obtained by the antenna port. The measurement information of the antenna port indicates channel quality when measurement is performed by the antenna port according to the corresponding configuration information.

Step 404, measurement information of the OAM measurement reference signal is received from the second communication device.

The measurement information may be channel state information (CSI). The CSI is configured to indicate the channel quality. The measurement information of the OAM measurement reference signal obtained from the second communication device includes CSI information measured by the antenna port. The CSI information includes at least one of the following information:

- indication information of an antenna port for the measurement reference signal recommended for use by the second communication device, for example, an antenna port serial number, or a resource (set) index for the measurement reference signal recommended for use;
- signal to interference plus noise ratio (SINR);
- reference signal receiving power (RSRP);
- reference signal received quality (RSRQ); or
- received signal strength indicator (RSSI).

Step 405, configuration information of a demodulation reference signal (DMRS) is transmitted to the second communication device according to the measurement information.

The DMRS is configured for downlink data demodulation.

In the embodiment of the present disclosure, the channel quality determined by the measurement of the antenna port of the second communication device may be determined according to the measurement information. An antenna port satisfying the quality requirement, the OAM mode value corresponding to the antenna port, and the time-frequency domain information may be determined according to the channel quality determined by the antenna port via measurement, which serves as the configuration information for the second communication device to receive the DMRS. In other words, when the demodulation reference signal is transmitted from the first communication device to the second communication device, it may be determined what configuration the second communication device needs to use to receive the demodulation reference signal, such that by transmitting the configuration information of the demodulation reference signal (DMRS) to the second communication device, the second communication device may receive the DMRS signal and data through the indicated DMRS antenna port set and a corresponding OAM mode value at a designated time-frequency domain position according to the configuration information of the DMRS.

The configuration information of the DMRS includes at least one of the following: an antenna port of the DMRS, time-frequency domain information of the DMRS, or an OAM mode value of the DMRS.

The configuration information of the DMRS is carried in at least one of the following:

- radio resource control (RRC) signaling; radio resource control (RRC) signaling; media access control (MAC) signaling; or physical layer signaling.

For explanation of the signaling, reference may be made to the explanation in the foregoing examples, which is not repeated here.

In the method for transmitting configuration information of a reference signal in the embodiment of the present disclosure, the capability information transmitted from the second communication device is received. The configuration information of the OAM measurement reference signal is transmitted to the second communication device. The OAM measurement reference signal transmitted from the first communication device is received according to the configuration information. In other words, the second communication device receives the OAM measurement reference information transmitted from the first communication device at the corresponding time-frequency domain position according to the antenna port designated in the configuration information and the corresponding OAM mode value, measures the channel quality according to the OAM measurement reference information, to determine channel measurement information corresponding to the antenna port, and further transmits the measurement information corresponding to the antenna port as measurement information of the OAM measurement reference signal of the second communication device to the first communication device, such that the first communication device may perform analysis according to the measurement information of the OAM measurement reference signal, that is, determine resource configuration of the demodulation reference signal through channel estimation, so as to improve the reliability of data transmission when downlink data transmission is performed on a physical downlink control channel (PDCCH) channel and a physical downlink shared channel (PDSCH).

Figure 5:
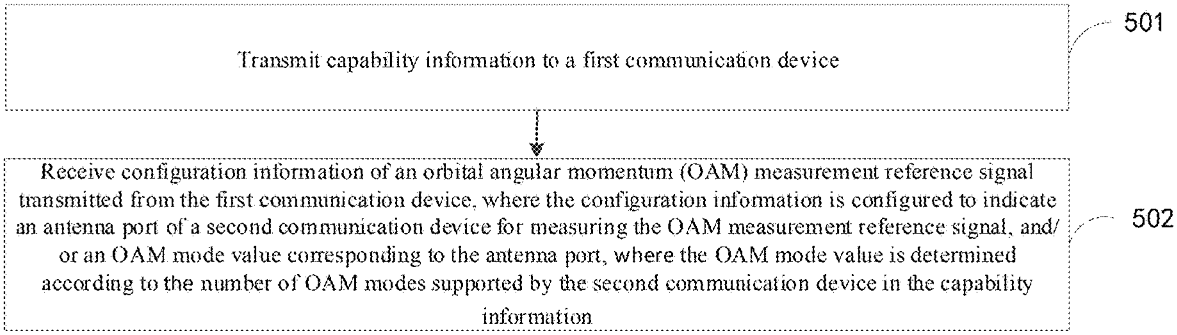
FIG. 5 is a schematic flowchart of a method for receiving configuration information of a reference signal according to an embodiment of the present disclosure.

With reference to FIG. 5, FIG. 5 is a schematic flowchart of a method for receiving configuration information of a reference signal according to an embodiment of the present disclosure. The method is performed by a second communication device.

In the embodiment of the present disclosure, description is made by taking the first communication device as a base station and a second communication device as a terminal device or a relay device.

In a first scenario of the embodiment of the present disclosure, the first communication device is a base station, the second communication device is a terminal device or a relay device.

In a second scenario of the embodiment of the present disclosure, the first communication device is a base station, and the second communication device is a relay device.

In a third scenario of the embodiment of the present disclosure, the first communication device is a relay device, the second communication device is a terminal device.

As shown in FIG. 5, the method may include, but is not limited to, step 501 and step 502 as follows.

Step 501, capability information is transmitted to a first communication device.

The capability information includes the number of OAM modes supported by the second communication device. The number of OAM modes may be the maximum number of OAM modes supported by the second communication device. The number of OAM modes may be a set integer value determined according to transmission performance of the second communication device. For example, the number of OAM modes may be 2, 6, or 9.

Optionally, the number of OAM modes supported by the second communication device is less than or equal to the maximum supported number of OAM modes, and may include the maximum number of OAM modes for transmission and the maximum number of OAM modes for reception supported by the second communications device.

In an implementation of the embodiment of the present disclosure, the second communication device receives a capability query request from the first communication device, such that the second communication device transmits the capability information to the first communication device.

In a second implementation of the embodiment of the present disclosure, the second communication device transmits the capability information to the first communication device actively.

The explanation of the foregoing examples is also applicable to the example, which is not repeated here.

Step 502, configuration information of an OAM measurement reference signal transmitted from the first communication device is received, where the configuration information is configured to indicate an antenna port of the second communication device for measuring the OAM measurement reference signal, and/or an OAM mode value corresponding to the antenna port, where the OAM mode value is determined according to the number of OAM modes supported by the second communication device in the capability information.

The OAM measurement reference signal refers to a downlink measurement reference signal carried on a spiral electromagnetic wave.

As an implementation, the configuration information is configured to indicate the antenna port of the second communication device for measuring the OAM measurement reference signal. At least one antenna port is provided. In other words, the antenna port, for measuring the OAM measurement reference signal, indicated in the configuration information is an antenna port configured to measure the OAM measurement reference signal, and the antenna port has a corresponding OAM mode value. Thus the antenna port, for measuring the OAM measurement reference signal, indicated in the configuration information may allow the second communication device to determine the OAM mode value corresponding to the at least one antenna port.

As a second implementation, the configuration information is configured to indicate the OAM mode value corresponding to the antenna port. The corresponding antenna port may be determined according to the OAM mode value. At least one antenna port is provided. For example, when the OAM mode value is [−2, 1], it is determined that the corresponding antenna ports are port 2 to port 5, and a correspondence relationship between the OAM measurement value and the antenna port is established by indicating the OAM mode value corresponding to the antenna port.

As a third implementation, the configuration information is configured to indicate at least one antenna port of the second communication device for measuring the OAM measurement reference signal and the OAM mode value corresponding to the at least one antenna port, such that dual indication is achieved, that is, the antenna port is indicated, and the OAM mode value corresponding to the antenna port is also indicated. Therefore, the OAM mode value corresponding to the antenna port is determined when the antenna port measures the OAM measurement reference signal. In a case where the OAM mode value corresponding to the antenna port is not fixed, a correspondence relationship between the antenna port and the OAM mode value may be established, and reliability of determining the OAM mode value of the OAM measurement reference signal corresponding to the antenna port is improved.

For the OAM mode value and the number of OAM modes, in an implementation of the embodiment of the present disclosure, there is a correspondence relationship between the OAM mode value and the number of OAM modes supported by the second communication device. The correspondence relationship is configured to generate the OAM mode value in the configuration information according to the number of OAM modes in the capability information. It should be noted that the OAM mode value corresponds to a mode of the OAM. The number of OAM modes is also referred to as the OAM mode count.

In an implementation of the embodiment of the present disclosure, the number of OAM modes supported by the second communication device corresponds to the OAM mode value combination. The OAM mode value combination includes OAM mode values matching the number of OAM modes supported by the second communication device. The number of OAM modes matches the number of OAM mode values. For example, in a case that the number of OAM modes is 8, the OAM mode value combination is [−4, −3, −2, −1, 0, 1, 2, 3], and the number of the OAM mode value is 8, such that the number of the OAM mode values 8 matches the number of OAM modes 8. The correspondence relationship between the number of OAM modes and the OAM mode value combination may be preset. The correspondence relationship between the OAM mode value combination and the number of OAM modes and an interval between the OAM mode values in the OAM mode value combination are not limited in the example. Further, after the corresponding OAM mode value combination is determined according to the number of OAM modes, when the OAM mode value corresponding to at least one antenna port is selected from the OAM mode value combination, as an implementation, the OAM mode value corresponding to at least one antenna port is determined in a random matching manner. As a second implementation, the OAM mode values with a greater module value interval may be selected from the OAM mode value combination as the OAM mode value corresponding to at least one antenna port. As a third implementation, the OAM mode value corresponding to the number of the antenna port and having a greater module value may be selected from the OAM mode value combination as the OAM mode value corresponding to at least one antenna port.

In the method for receiving configuration information of a reference signal according to the embodiment of the present disclosure, the capability information is transmitted to the first communication device, and the configuration information of the OAM measurement reference signal is received from the first communication device, where the configuration information is configured to indicate an antenna port of the second communication device for measuring the OAM measurement reference signal, and/or an OAM mode value corresponding to the antenna port, and the OAM mode value is determined according to the number of OAM modes supported by the second communication device in the capability information. The configuration information of the OAM measurement reference signal corresponding to the second communication device is determined according to the capability information reported by the second communication device, such that channel measurement is implemented by configuring the OAM measurement reference signal when downlink data transmission is performed between the first communication device and the second communication device by using an OAM signal.

Figure 6:
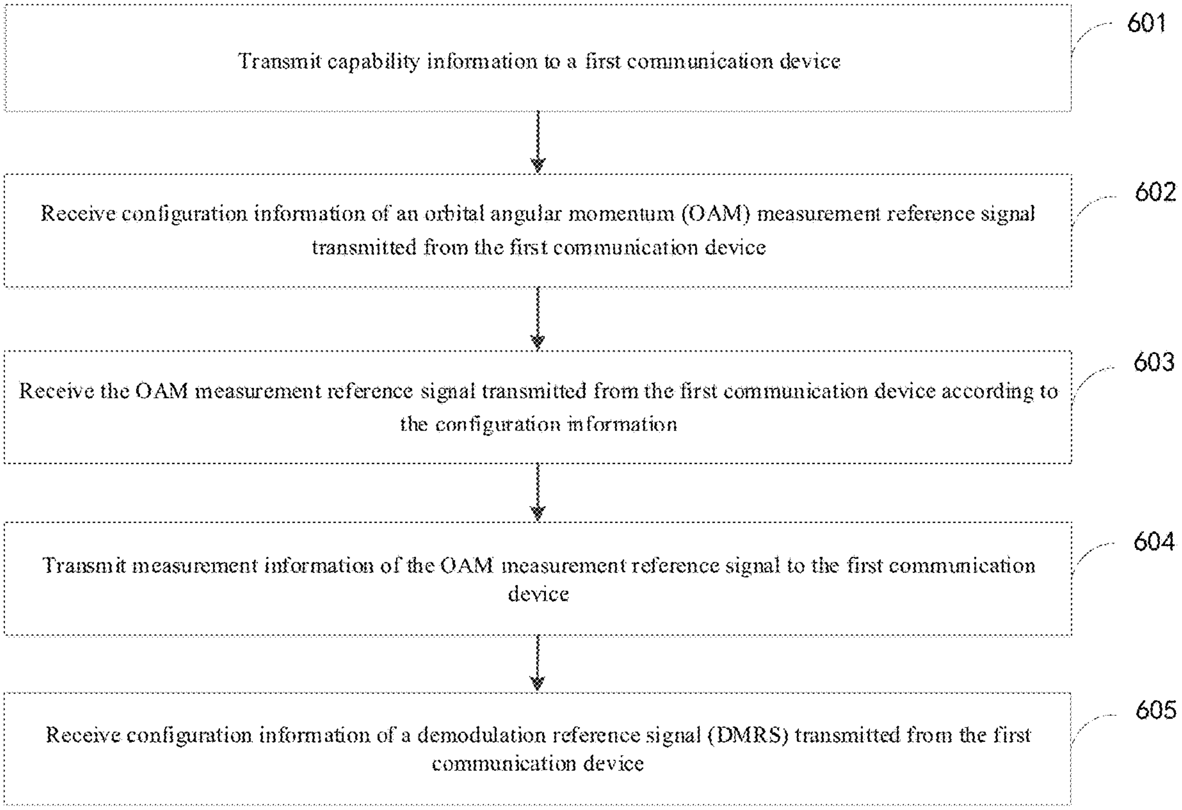
FIG. 6 is a schematic flowchart of a method for receiving configuration information of a reference signal according to another embodiment of the present disclosure.

With reference to FIG. 6, FIG. 6 is a schematic flowchart of a method for receiving configuration information of a reference signal according to an embodiment of the present disclosure. The method is performed by a second communication device. As shown in FIG. 6, the method may include, but is not limited to, step 601 to step 605 as follows.

Step 601, capability information is transmitted to a first communication device.

For a specific implementation process of step 601, reference may be made to the detailed description of any embodiment of the present disclosure, which is not repeated here.

The capability information includes support information of an OAM capability and the number of OAM modes supported by the second communication device.

The support information of the OAM capability is configured to determine to transmit the configuration information to the second communication device in response to determining by the first communication device that the second communication device has the OAM capability according to the support information of the OAM capability.

The number of OAM modes is configured for the first communication device to generate configuration information according to the number of OAM modes. The configuration information includes indication information of at least one antenna port and/or an OAM mode value of the OAM measurement reference signal corresponding to the at least one antenna port.

The explanation about the capability information in any embodiment of the present disclosure is also applicable to the example, which is not repeated here.

Step 602, configuration information of an orbital angular momentum (OAM) measurement reference signal transmitted from the first communication device is received.

In the embodiment of the present disclosure, the configuration information further includes time-frequency domain position indication information. The time-frequency domain position indication information is configured to indicate a time-frequency domain position of the OAM measurement reference signal corresponding to the antenna port. The time-frequency domain position indication information includes at least one of the following:

time domain position indication information;

frequency domain position indication information; or a time-frequency domain pattern.

The configuration information is carried in at least one of the following:

RRC signaling;

MAC signaling; or physical layer signaling.

It should be noted that the explanation about the configuration information of any example in the present disclosure is also applicable to Step 602, which is not repeated here.

Step 603, the OAM measurement reference signal transmitted from the first communication device is received according to the configuration information.

Step 604, measurement information of the OAM measurement reference signal is transmitted to the first communication device.

Step 605: configuration information of a demodulation reference signal (DMRS) transmitted from the first communication device is received.

The configuration information of the DMRS is generated according to the measurement information, and the configuration information of the DMRS includes at least one of the following: an antenna port of the DMRS, time-frequency domain information of the DMRS, or an OAM mode value of the DMRS.

For a specific implementation process of steps 603-605, reference may be made to the detailed description of any embodiment of the present disclosure, which is not repeated here.

In the method for receiving configuration information of a reference signal in the embodiment of the present disclosure, in response to determining that the second communication device has the OAM capability according to the capability information reported by the second communication device, the first communication device determines the indication information of the antenna port of the second communication device and the corresponding OAM mode value according to the number of OAM modes in the capability information. In addition, the configuration information further includes the time-frequency domain position indication information corresponding to the antenna port, such that the antenna port for measuring the OAM measurement reference signal and the OAM mode value corresponding to the antenna port and the time-frequency domain position indication information of the OAM measurement reference signal are configured during downlink transmission, and the problem of resource configuration is solved. Then, the OAM measurement reference signal transmitted from the first communication device is received according to the configuration information. In other words, the second communication device receives the OAM measurement reference information transmitted from the first communication device at the time-frequency domain position indicated in the configuration information according to the at least one antenna port designated in the configuration information and the corresponding OAM mode value, measures the channel quality according to the OAM measurement reference information, to determine channel measurement information corresponding to the at least one antenna port, and further transmits the measurement information corresponding to the antenna port as measurement information of the OAM measurement reference signal of the second communication device to the first communication device, such that the first communication device may perform analysis according to the measurement information of the OAM measurement reference signal, that is, determines resource configuration of the demodulation reference signal through channel estimation, to improve the reliability of data transmission when downlink data transmission is performed on a physical downlink control channel (PDCCH) channel and a physical downlink shared channel (PDSCH).

In the above embodiments provided in the present disclosure, the method provided by the examples of the present disclosure is introduced from the perspectives of a first communication device and a second communication device separately. In order to implement functions in the method provided in the above examples of the present disclosure, the first communication device and the second communication device may include a hardware structure and a software module. The above functions are implemented in a form of a hardware structure, a software module, or a hardware structure and a software module. Any one of the above functions may be executed by a hardware structure, a software module, or a hardware structure and a software module.

Figure 7:
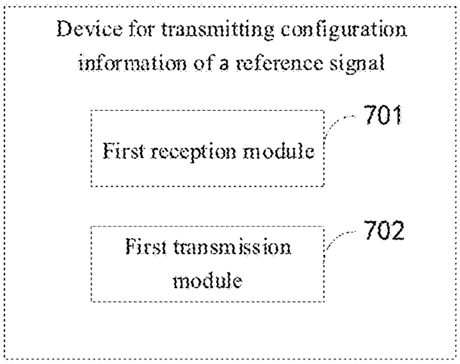
FIG. 7 is a schematic structural diagram of a device for transmitting configuration information of a reference signal according to an embodiment of the present disclosure.

FIG. 7 is a schematic structural diagram of a device for transmitting configuration information of a reference signal according to an embodiment of the present disclosure. The device for transmitting configuration information of a reference signal includes a first reception module 701 and a first transmission module 702. The first transmission module 702 is configured to implement a transmission function. The first reception module 701 is configured to implement a reception function.

The device for transmitting configuration information of a reference signal may be a first communication device, a device in the first communication device, or a device capable of cooperating with the first communication device for use.

The device for transmitting configuration information of a reference signal includes:

the first reception module 701, configured to receive capability information transmitted from a second communication device; and the first transmission module 702, configured to transmit configuration information of an orbital angular momentum (OAM) measurement reference signal to the second communication device, where the configuration information is configured to indicate an antenna port of the second communication device for measuring the OAM measurement reference signal, and/or an OAM mode value corresponding to the antenna port, where the OAM mode value is determined according to the number of OAM modes supported by the second communication device in the capability information.

As an implementation, there is a correspondence relationship between the OAM mode value and the number of OAM modes. The correspondence relationship is configured to generate the OAM mode value in the configuration information according to the number of OAM modes in the capability information.

As an implementation, the capability information includes support information of an OAM capability and the number of OAM modes supported by the second communication device.

The first transmission module 702 is specifically configured to:

determine the OAM mode value of the OAM measurement reference signal corresponding to the antenna port according to the number of OAM modes supported by the second communication device in response to determining that the second communication device has the OAM capability according to the support information of the OAM capability; and transmit the configuration information of the OAM measurement reference signal to the second communication device, where the configuration information includes indication information of the antenna port and/or the OAM mode value of the OAM measurement reference signal corresponding to the antenna port.

As an implementation, the configuration information includes time-frequency domain position indication information.

The time-frequency domain position indication information is configured to indicate a time-frequency domain position of the OAM measurement reference signal corresponding to the antenna port.

As an implementation, the time-frequency domain position indication information includes at least one of the following:

time domain position indication information;

frequency domain position indication information; or a time-frequency domain pattern.

As an implementation, the configuration information is carried in at least one of the following:

radio resource control (RRC) signaling;

media access control (MAC) signaling; or physical layer signaling.

As an implementation, the first transmission module 702 is further configured to transmit the OAM measurement reference signal to the second communication device according to the configuration information.

The first reception module 701 is further configured to receive measurement information of the OAM measurement reference signal from the second communication device.

The first transmission module 702 is further configured to transmit configuration information of a demodulation reference signal (DMRS) to the second communication device according to the measurement information, where the configuration information of the DMRS includes at least one of the following: an antenna port of the DMRS, time-frequency domain information of the DMRS, or an OAM mode value of the DMRS.

As an implementation, the first communication device is a base station, and the second communication device is a relay device; alternatively, the first communication device is a relay device, and the second communication device is a terminal device; alternatively, the first communication device is a base station, and the second communication device is a terminal device.

In the present disclosure, the configuration information of the OAM measurement reference signal corresponding to the second communication device is determined according to the received capability information of the second communication device, such that the configuration information for the second communication device to measure the OAM measurement reference signal is determined when downlink data transmission is performed between the first communication device and the second communication device by using an OAM signal.

Figure 8:
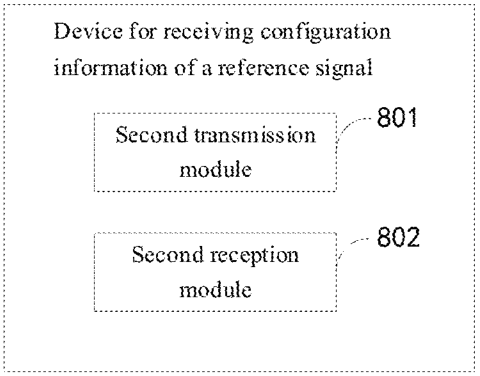
FIG. 8 is a schematic structural diagram of a device for receiving configuration information of a reference signal according to an embodiment of the present disclosure.

FIG. 8 is a schematic structural diagram of a device for receiving configuration information of a reference signal according to an embodiment of the present disclosure. The device for receiving configuration information of a reference signal includes a second transmission module 801 and a second reception module 802.

The device for receiving configuration information of a reference signal may be a second communication device, a device in the second communication device, or a device capable of cooperating with the second communication device for use.

The device for receiving configuration information of a reference signal includes:

the second transmission module 801, configured to transmit capability information to a first communication device; and the second reception module 802, configured to receive configuration information of an orbital angular momentum (OAM) measurement reference signal from the first communication device, where the configuration information is configured to indicate an antenna port of the second communication device for measuring the OAM measurement reference signal, and/or an OAM mode value corresponding to the antenna port, where the OAM mode value is determined according to the number of OAM modes supported by the second communication device in the capability information.

As an implementation, there is a correspondence relationship between the OAM mode value and the number of OAM modes. The correspondence relation is configured to generate the OAM mode value in the configuration information according to the number of OAM modes in the capability information.

As an implementation, the capability information includes support information of an OAM capability and the number of OAM modes supported by the second communication device.

The support information of the OAM capability is configured to determine to transmit the configuration information to the second communication device in response to determining by the first communication device that the second communication device has the OAM capability according to the support information of the OAM capability.

The number of OAM modes supported by the second communication device is configured for the first communication device to generate the configuration information. The configuration information includes antenna port information for measuring the OAM measurement reference signal, and/or an OAM mode value corresponding to the antenna port.

As an implementation, the configuration information includes time-frequency domain position indication information.

The time-frequency domain position indication information is configured to indicate a time-frequency domain position of the OAM measurement reference signal corresponding to at least one antenna port. As an implementation, the time-frequency domain position indication information includes at least one of the following:

time domain position indication information;

frequency domain position indication information; or a time-frequency domain pattern.

As an implementation, the configuration information is carried in at least one of the following:

RRC signaling;

MAC signaling; and physical layer signaling.

As an implementation, the second reception module 802 is further configured to receive the OAM measurement reference signal transmitted from the first communication device according to the configuration information.

The second transmission module 801 is further configured to transmit measurement information of the OAM measurement reference signal to the first communication device; and The second reception module 802 is further configured to receive configuration information of a demodulation reference signal (DMRS) transmitted from the first communication device, where the configuration information of the DMRS is generated according to the measurement information, and the configuration information of the DMRS includes at least one of the following: an antenna port of the DMRS, time-frequency domain information of the DMRS, or an OAM mode value of the DMRS.

As an implementation, the first communication device is a base station, and the second communication device is a relay device; alternatively, the first communication device is a relay device, and the second communication device is a terminal device; alternatively, the first communication device is a base station, and the second communication device is a terminal device.

In the present disclosure, the configuration information of the OAM measurement reference signal corresponding to the second communication device is determined according to the capability information of the second communication device, such that the configuration information for the second communication device to measure the OAM measurement reference signal is determined when downlink data transmission is performed between the first communication device and the second communication device by using an OAM signal.

Figure 9:
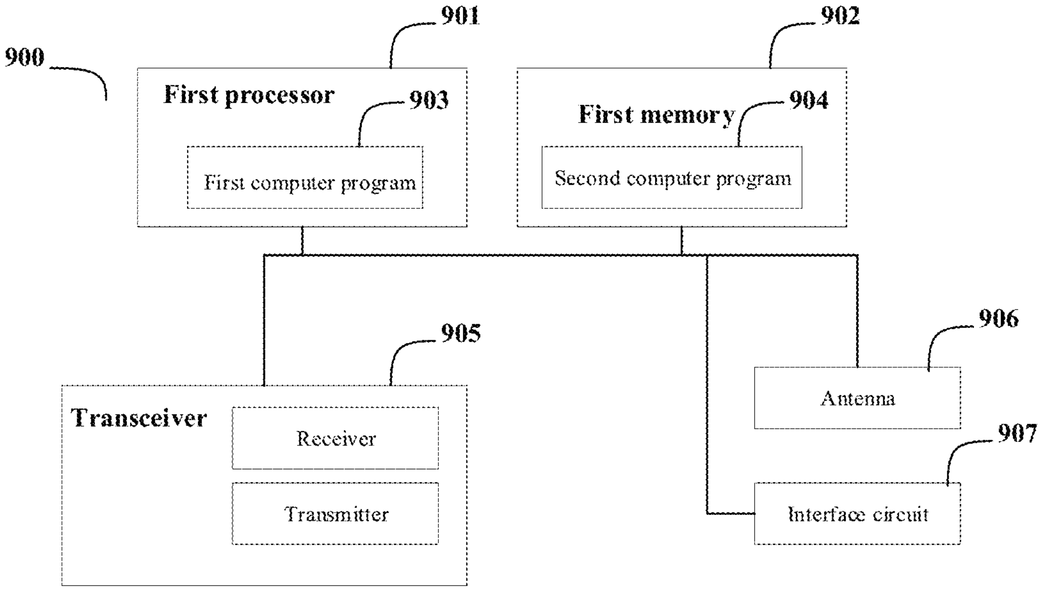
FIG. 9 is a schematic structural diagram of a communication device according to an embodiment of the present disclosure.

With reference to FIG. 9, FIG. 9 is a schematic structural diagram of a communication device 900 according to an embodiment of the present disclosure. The communication device 900 may be a first communication device, may be a second communication device, may be a chip, a chip system, or a processor that supports a first communication device to implement the above method, and may also be a chip, a chip system, or a processor that supports a second communication device to implement the above method. The device may be configured to implement the methods described in the above method examples, and reference may be made to description in the above method examples for details. The communication device 900 may include one or more first processors 901. The first processor 901 may be a general-purpose processor or a special purpose processor, etc., such as a baseband processor or a central processor. The baseband processor may be configured to process a communication protocol and communication data. The central processor may be configured to control a communication device (for example, a base station, a baseband chip, a terminal device, a terminal device chip, a DU or a CU), execute a computer program, and process data of the computer program.

Optionally, the communication device 900 may further include one or more first memories 902 that may store a second computer program 904. The first processor 901 executes the second computer program 904 to cause the communication device 900 to execute the method described in the above method examples. Optionally, the one or more first memories 902 may also store data. The communication device 900 and the one or more first memories 902 may be arranged separately or may be integrated together.

Optionally, the communication device 900 may further include a transceiver 905 and an antenna 906. The transceiver 905 may be referred to as a transceiving unit, a transceiving machine, or a transceiving circuit, etc., and is configured to implement a transceiving function. The transceiver 905 may include a receiver and a transmitter. The receiver may be referred to as a receiving machine or a receiving circuit, etc., for implementing a reception function. The transmitter may be referred to as a transmitting machine or a transmitting circuit, etc., for implementing a transmission function.

Optionally, the communication device 900 may further include one or more interface circuits 907. The interface circuit 907 is configured to receive a code instruction and transmit the code instruction to the first processor 901. The first processor 901 runs the code instruction to cause the communication device 900 to execute the method described in the above method examples.

In an implementation, the first processor 901 may include a transceiver for implementing a reception function and a transmission function. For example, the transceiver may be a transceiving circuit, or an interface, or an interface circuit. The transceiving circuit, interface, or interface circuit for implementing the reception function and the transmission function may be separated or integrated. The transceiving circuit, interface or interface circuit may be configured to read and write a code/data, and alternatively, the transceiving circuit, interface or interface circuit may be configured to transmit or transfer a signal.

In one implementation, the first processor 901 may store a first computer program 903. The first computer program 903 runs on the first processor 901 and causes the communication device 900 to execute the method described in the method examples above. The first computer program 903 may be embedded in the first processor 901. In this case, the first processor 901 may be implemented by hardware.

In an implementation, the communication device 900 may include a circuit that may implement the functions of transmission, reception or communication in the foregoing method examples. The processor and transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and transceiver may also be fabricated by using various IC process technologies, such as a complementary metal oxide semiconductor (CMOS), an n-metal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above examples may be a first communication device or a second communication device. The scope of the communication device described in the present disclosure is not limited to this, and a structure of the communication device may not be limited by FIG. 9. The communication device may be a stand-alone device or may be part of a larger device. For example, the communication device may be:

(1) an independent integrated circuit (IC), a chip, a chip system or a subsystem;

(2) a set of one or more ICs, optionally including a memory component for storing data and a computer program;

(3) an ASIC, such as a modem;

(4) a module that can be embedded in other devices;

(5) a receiver machine, a terminal device, an intelligent terminal device, a cellular phone, a radio device, a handset, a mobile unit, a vehicle-mounted device, a network device, a cloud device, an artificial intelligence device, etc.; and (6) a different device, etc.

Figure 10:
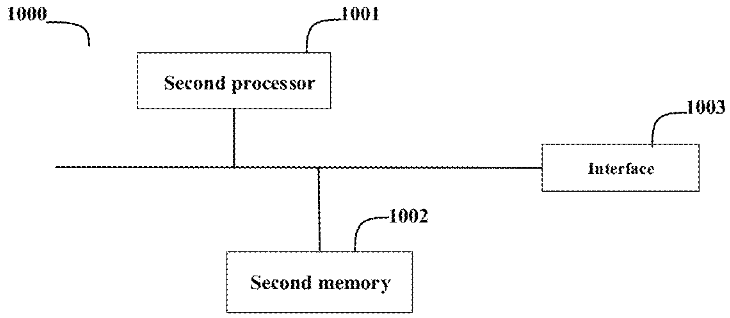
FIG. 10 is a schematic structural diagram of a chip according to an embodiment of the present disclosure.

Reference may be made to a schematic structural diagram of a chip shown in FIG. 10 for the case that the communication device may be a chip or a chip system. The chip shown in FIG. 10 includes a second processor 1001 and an interface 1003. One or more second processors 1001 may be provided. A plurality of interfaces 1003 may be provided.

For the case that the chip is configured to achieve the first communication device in the embodiment of the present disclosure:

the interface 1003 is configured to execute steps 201 and 202 in FIG. 2, steps 301, 302 and 303 in FIG. 3, steps 401, 402, 403, 404 and 405 in FIG. 4, etc.

For the case that the chip is configured to achieve the second communication device in the embodiment of the present disclosure:

the interface 1003 is configured to execute steps 501 and 502 in FIG. 5, steps 601, 602, 603, 604 and 605 in FIG. 6, etc.

Optionally, the chip further includes a second memory 1002. The second memory 1002 is configured to store a necessary computer program and data.

Those skilled in the art will further appreciate that the various illustrative logical blocks and steps set forth in the examples of the present disclosure may be implemented by electronic hardware, computer software, or combinations of both. Whether such functions are implemented by hardware or software depends on a particular application and overall system design requirements. Those skilled in the art may use various methods to implement the functions for each particular application, but such implementation should not be understood to be beyond the scope of protection of the examples of the present disclosure.

A non-transitory computer-readable storage medium is further provided according to the present disclosure. The non-transitory computer-readable storage medium stores instructions. The instructions, when executed by a computer, implement the functions of any one of the method embodiments.

A computer program product is further provided according to the present disclosure. The computer program product, when executed by a computer, implements the functions of the method embodiments.

The embodiments described above can be implemented in whole or in part by software, hardware, firmware, or their any combinations. When implemented through the software, all or some of the modules may be implemented in the form of computer program products. The computer program product includes one or more computer programs. When loaded and executed on a computer, the computer program generates in whole or in part the flows or functions described in accordance with the examples of the present disclosure. The computer may be a general-purpose computer, a special-purpose computer, a computer network, or another programmable device. The computer program may be stored in a non-transitory computer-readable storage medium or transmitted from one non-transitory computer-readable storage medium to another non-transitory computer-readable storage medium. For example, the computer program can be transmitted from one website, computer, server, or data center to another website, computer, server, or data center through a wired means (for example, a coaxial cable, an optical fiber, and a digital subscriber line (DSL)) or through a wireless means (for example, infrared, radio waves, and microwaves, etc.). The non-transitory computer-readable storage medium may be any available medium that can be accessed by a computer or a data storage device including one or more available media integrated server, a data center, etc. The available medium may be a magnetic medium (for example, a floppy disk, a hard disk, a magnetic tape), an optical medium (for example, a digital video disk (DVD)), or a semiconductor medium (for example, a solid-state disk (SSD)), etc.

A method and device for transmitting configuration information of a reference signal, and a method and device for receiving configuration information of a reference signal are provided according to embodiments of the present disclosure, which can be applied to the Internet of Vehicles including vehicle to everything (V2X) communication, long term evolution-vehicle (LTE-V) communication technology, vehicle to vehicle (V2V) communication, etc., or can be applied to fields including Internet of Things, virtual reality (VR), augmented reality (AR), etc., to determine configuration information for a second communication device to measure an orbital angular momentum (OAM) measurement reference signal based on capability information of the second communication device.

In the technical solution, the first communication device determines configuration information for measuring the OAM measurement reference signal by at least one antenna port of the second communication device based on the capability information received from the second communication device, and transmits the configuration information to the second communication device, to determine the configuration information for the second communication device to measure the OAM measurement reference signal.

A person of ordinary skill in the art will understand that the various numerical designations, such as first and second, used in the present disclosure are distinguished one from another for convenience of description and are not intended to limit the scope of the disclosed embodiments, nor do they imply any particular order.

At least one in the present disclosure may also be described as one or more. The plural may be two, three, four, or more, which are not limited in the present disclosure. In the examples of the present disclosure, for a type of technical feature, technical features in such a type of technical feature are distinguished by “first”, “second”, “third”, “A”, “B”, “C” and “D”, and the technical features described by the “first”, “second”, “third”, “A”, “B”, “C” and “D” have no order of sequence or order of magnitude.

Correspondence relationships shown in tables of the present disclosure may be configured or predefined. Values of information in each table are only instances, and may be configured as other values, which are not limited in the present disclosure. When a correspondence relationship between the information and each parameter is configured, it is not necessarily required to configure all the correspondence relations indicated in each table. For example, in the tables of the present disclosure, the correspondence relations shown in some rows may not be configured. For another example, appropriate modification adjustments, such as splitting, merging, etc., can be made based on the above table. Names of the parameters shown in the titles of the above tables may also be other names that can be understood by the communication device, and values or expression modes of the parameters may also be other values or expression modes that can be understood by the communication device. When the tables are implemented, other data structures may also be used, such as an array, a queue, a container, a stack, a linear table, a pointer, a linked list, a tree, a graph, a structure, a class, a heap, and a hash table.

Predefinition in the present disclosure may be understood as defining, predefining, storing, pre-storing, pre-negotiating, pre-configuring, solidifying, or pre-firing.

A person of ordinary skill in the art may appreciate that the units and algorithm steps of the instances described in conjunction with the examples disclosed here may be implemented in electronic hardware, or a combination of computer software and electronic hardware. Whether these functions are performed with hardware or software depends on the specific application and design constraints of the technical solution. Those skilled can implement the described functions with different methods for each particular application, but such implementation should not be considered to fall beyond the scope of the present disclosure. Those skilled in the art will clearly appreciate that, for convenience and conciseness of description, reference can be made to corresponding processes in the foregoing method examples for specific working processes of the above systems, devices and units, which will not be repeated here.

The described above are merely specific embodiments of the present disclosure, and are not intended to limit the scope of protection of the present disclosure. Any variations or substitutions within the technical scope disclosed in the present disclosure which can be easily conceived by any person of ordinary skill in the art should fall within the scope of protection of the present disclosure. Hence, the scope of protection of the present disclosure should be subject to the protection scope of the claims.

The invention claimed is:

1. A method for transmitting configuration information of a reference signal, performed by a first communication device, the method comprising:

receiving capability information transmitted from a second communication device, wherein the capability information comprises a number of orbital angular momentum (OAM) modes supported by the second communication device; and transmitting configuration information of an OAM measurement reference signal to the second communication device, wherein the configuration information is configured to indicate an antenna port of the second communication device for measuring the OAM measurement reference signal and an OAM mode value corresponding to the antenna port, wherein a correspondence relationship is established between the OAM mode value and the number of OAM modes, and the OAM mode value is determined according to the number of OAM modes supported by the second communication device.

2. The method according to claim 1, wherein the correspondence relationship is configured to generate the OAM mode value in the configuration information according to the number of OAM modes in the capability information.

3. The method according to claim 1, wherein the capability information further comprises support information of an OAM capability; and transmitting the configuration information of the OAM measurement reference signal to the second communication device comprises:

determining, in response to determining that the second communication device has the OAM capability according to the support information of the OAM capability, the OAM mode value of the OAM measurement reference signal corresponding to the antenna port according to the number of OAM modes supported by the second communication device; and transmitting the configuration information of the OAM measurement reference signal to the second communication device, wherein the configuration information comprises the antenna port for measuring the OAM measurement reference signal and the OAM mode value corresponding to the antenna port.

4. The method according to claim 1, wherein the configuration information comprises time-frequency domain position indication information, and the time-frequency domain position indication information is configured to indicate a time-frequency domain position of the OAM measurement reference signal corresponding to the antenna port.

5. The method according to claim 4, wherein the time-frequency domain position indication information comprises at least one of:

time domain position indication information;

frequency domain position indication information; or a time-frequency domain pattern.

6. The method according to claim 1, wherein the configuration information is carried in at least one of:

radio resource control (RRC) signaling;

media access control (MAC) signaling; or physical layer signaling.

7. The method according to claim 1, further comprising:

transmitting the OAM measurement reference signal to the second communication device based on the configuration information;

receiving measurement information of the OAM measurement reference signal from the second communication device; and transmitting configuration information of a demodulation reference signal (DMRS) to the second communication device according to the measurement information, wherein the configuration information of the DMRS comprises at least one of an antenna port of the DMRS, time-frequency domain information of the DMRS, or an OAM mode value of the DMRS.

8. The method according to claim 1, wherein the first communication device is a base station, and the second communication device is a relay device;

the first communication device is the relay device, and the second communication device is a terminal device; or the first communication device is the base station, and the second communication device is the terminal device.

9. A method for receiving configuration information of a reference signal, performed by a second communication device, the method comprising:

transmitting capability information to a first communication device, wherein the capability information comprises a number of orbital angular momentum (OAM) modes supported by the second communication device; and receiving configuration information of an OAM measurement reference signal transmitted from the first communication device, wherein the configuration information is configured to indicate an antenna port of the second communication device for measuring the OAM measurement reference signal and an OAM mode value corresponding to the antenna port, wherein a correspondence relationship is established between the OAM mode value and the number of OAM modes, and the OAM mode value is determined according to the number of OAM modes supported by the second communication device.

10. The method according to claim 9, wherein the correspondence relationship is configured to generate the OAM mode value in the configuration information according to the number of OAM modes in the capability information.

11. The method according to claim 9, wherein the capability information further comprises support information of an OAM capability;

the support information of the OAM capability is configured to determine to transmit the configuration information to the second communication device in response to determining by the first communication device that the second communication device has the OAM capability according to the support information of the OAM capability; and the number of OAM modes supported by the second communication device is configured for the first communication device to generate the configuration information, wherein the configuration information comprises the antenna port for measuring the OAM measurement reference signal and the OAM mode value corresponding to the antenna port.

12. The method according to claim 9, wherein the configuration information comprises time-frequency domain position indication information, and the time-frequency domain position indication information is configured to indicate a time-frequency domain position of the OAM measurement reference signal corresponding to the antenna port.

13. The method according to claim 12, wherein the time-frequency domain position indication information comprises at least one of:

time domain position indication information;

frequency domain position indication information; or a time-frequency domain pattern.

14. The method according to claim 9, wherein the configuration information is carried in at least one of:

radio resource control (RRC) signaling;

media access control (MAC) signaling; or physical layer signaling.

15. The method according to claim 9, further comprising:

receiving the OAM measurement reference signal transmitted from the first communication device based on the configuration information;

transmitting measurement information of the OAM measurement reference signal to the first communication device; and receiving configuration information of a demodulation reference signal (DMRS) transmitted from the first communication device, wherein the configuration information of the DMRS is generated according to the measurement information, and the configuration information of the DMRS comprises at least one of an antenna port of the DMRS, time-frequency domain information of the DMRS, or an OAM mode value of the DMRS.

16. The method according to claim 9, wherein the first communication device is a base station, and the second communication device is a relay device;

the first communication device is the relay device, and the second communication device is a terminal device; or the first communication device is the base station, and the second communication device is the terminal device.

17. A communication device, comprising:

one or more processors; and a memory that stores a computer program, wherein the one or more processors execute the computer program stored in the memory to cause the communication device to receive capability information transmitted from a second communication device, wherein the capability information comprises a number of orbital angular momentum (OAM) modes supported by the second communication device; and transmit configuration information of an OAM measurement reference signal to the second communication device, wherein the configuration information is configured to indicate an antenna port of the second communication device for measuring the OAM measurement reference signal and an OAM mode value corresponding to the antenna port, wherein a correspondence relationship is established between the OAM mode value and the number of OAM modes, and the OAM mode value is determined according to the number of OAM modes supported by the second communication device.

18. A communication device, comprising:

one or more processors; and a memory that stores a computer program, wherein the one or more processors execute the computer program stored in the memory to cause the communication device to perform the method for receiving the configuration information of the reference signal according to claim 9.

19. A non-transitory computer-readable storage medium, configured to store instructions, wherein the instructions, when executed by one or more processors, cause the one or more processors to implement the method for transmitting the configuration information of the reference signal according to claim 1.

20. A non-transitory computer-readable storage medium, configured to store instructions, wherein the instructions, when executed by one or more processors, cause the one or more processors to implement the method for receiving the configuration information of the reference signal according to claim 9.

* * * * *